US007752294B2

(12) United States Patent
Meyer et al.

(10) Patent No.: US 7,752,294 B2
(45) Date of Patent: Jul. 6, 2010

(54) METHOD AND SYSTEM FOR DYNAMIC EXPANSION AND CONTRACTION OF NODES IN A STORAGE AREA NETWORK

(75) Inventors: Richard Meyer, San Francisco, CA (US); Yuri Khodosh, Sunnyvale, CA (US); Andrey Gusev, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 1818 days.

(21) Appl. No.: 10/695,887

(22) Filed: Oct. 28, 2003

(65) Prior Publication Data

US 2004/0148380 A1    Jul. 29, 2004

Related U.S. Application Data

(60) Provisional application No. 60/422,109, filed on Oct. 28, 2002.

(51) Int. Cl.
| | |
|---|---|
| *G06F 15/167* | (2006.01) |
| *G06F 15/173* | (2006.01) |
| *G06F 12/00* | (2006.01) |
| *G06F 13/00* | (2006.01) |
| *G06F 13/28* | (2006.01) |
| *G06F 9/26* | (2006.01) |
| *G06F 9/34* | (2006.01) |

(52) U.S. Cl. .................. 709/223; 709/215; 709/216; 711/111; 711/114; 711/203
(58) Field of Classification Search ......... 709/201–203, 709/220–226, 200, 208–211, 213–216, 229, 709/245–246, 248–249; 711/1–6, 111–114, 711/148, 202–203, 209; 710/2
See application file for complete search history.

(56) References Cited

U.S. PATENT DOCUMENTS

| 4,916,608 A | * | 4/1990 | Shultz ...................... 718/104 |
| 4,943,910 A | * | 7/1990 | Nakamura .................... 711/2 |
| 5,146,571 A | * | 9/1992 | Logan ........................ 714/8 |
| 5,778,411 A | * | 7/1998 | DeMoss et al. ............... 711/4 |
| 5,897,661 A | * | 4/1999 | Baranovsky et al. ........ 711/170 |
| 6,067,608 A | * | 5/2000 | Perry ...................... 711/203 |
| 6,104,871 A | * | 8/2000 | Badovinatz et al. ........ 718/100 |
| 6,145,028 A | * | 11/2000 | Shank et al. ................ 710/31 |
| RE36,989 E | * | 12/2000 | White ...................... 711/118 |
| 6,260,120 B1 | * | 7/2001 | Blumenau et al. ........... 711/152 |
| 6,295,575 B1 | * | 9/2001 | Blumenau et al. ............. 711/5 |

(Continued)

*Primary Examiner*—Asad M Nawaz
(74) *Attorney, Agent, or Firm*—Wiesner & Associates; Leland Wiesner (57) ABSTRACT

A method and system to add a storage controller in a SAN includes receiving a storage controller node to add to a logical storage controller in the storage area network having a logical nodename and a sequence of logical ports, adopting the logical nodename from the logical storage controller in place of the predetermined nodename associated with the storage controller and renumbering a set of ports associated with the storage controller to extend the sequence of logical ports associated with the logical storage controller. Removing the storage controller includes removing a storage controller node from the logical storage controller in the storage area network having a logical nodename and a sequence of logical ports, deleting the set of ports associated with the removed storage controller from the sequence of logical ports associated with the logical storage controller and renumbering the sequence of logical ports to accommodate the deleted ports.

28 Claims, 8 Drawing Sheets

U.S. PATENT DOCUMENTS

| | | | |
|---|---|---|---|
| 6,421,711 B1 * | 7/2002 | Blumenau et al. | 709/213 |
| 6,442,666 B1 * | 8/2002 | Stracovsky | 711/206 |
| 6,502,162 B2 * | 12/2002 | Blumenau et al. | 711/5 |
| 6,651,154 B1 * | 11/2003 | Burton et al. | 711/202 |
| 6,654,830 B1 * | 11/2003 | Taylor et al. | 710/74 |
| 6,658,590 B1 * | 12/2003 | Sicola et al. | 714/6 |
| 6,741,589 B1 * | 5/2004 | Sang et al. | 370/386 |
| 6,799,255 B1 * | 9/2004 | Blumenau et al. | 711/152 |
| 6,836,819 B2 * | 12/2004 | Kano et al. | 711/112 |
| 6,839,827 B1 * | 1/2005 | Beardsley et al. | 711/206 |
| 6,842,840 B1 * | 1/2005 | Reohr et al. | 711/172 |
| 6,898,670 B2 * | 5/2005 | Nahum | 711/114 |
| 6,920,494 B2 * | 7/2005 | Heitman et al. | 709/223 |
| 6,988,130 B2 * | 1/2006 | Blumenau et al. | 709/213 |
| 7,051,182 B2 * | 5/2006 | Blumenau et al. | 711/202 |
| 7,093,021 B2 * | 8/2006 | Blumenau et al. | 709/229 |
| 7,127,633 B1 * | 10/2006 | Olson et al. | 714/4 |
| 7,203,730 B1 * | 4/2007 | Meyer et al. | 709/213 |
| 7,215,580 B2 * | 5/2007 | Gorobets | 365/189.02 |
| 7,228,397 B2 * | 6/2007 | Tamura et al. | 711/162 |
| 7,328,298 B2 * | 2/2008 | Kamakura et al. | 710/305 |
| 7,398,326 B2 * | 7/2008 | Baldwin et al. | 709/249 |
| 7,412,543 B2 * | 8/2008 | Ohno et al. | 710/5 |
| 7,437,424 B2 * | 10/2008 | Uratani et al. | 709/213 |
| 7,457,899 B2 * | 11/2008 | Ohno et al. | 710/74 |
| 7,472,231 B1 * | 12/2008 | Cihla et al. | 711/144 |
| 7,620,981 B2 * | 11/2009 | Frank et al. | 726/15 |
| 7,657,613 B1 * | 2/2010 | Hanson et al. | 709/220 |
| 2002/0007445 A1 * | 1/2002 | Blumenau et al. | 711/153 |
| 2002/0029319 A1 * | 3/2002 | Robbins et al. | 711/114 |
| 2002/0126735 A1 * | 9/2002 | Rick et al. | 375/130 |
| 2002/0129246 A1 * | 9/2002 | Blumenau et al. | 713/168 |
| 2002/0131310 A1 * | 9/2002 | Kuwata | 365/200 |
| 2002/0147786 A1 * | 10/2002 | Murotani et al. | 709/213 |
| 2002/0188711 A1 * | 12/2002 | Meyer et al. | 709/223 |
| 2002/0194294 A1 * | 12/2002 | Blumenau et al. | 709/213 |
| 2003/0023784 A1 * | 1/2003 | Matsunami et al. | 710/36 |
| 2003/0191891 A1 * | 10/2003 | Tanaka et al. | 711/114 |
| 2003/0236945 A1 * | 12/2003 | Nahum | 711/114 |
| 2004/0054849 A1 * | 3/2004 | Deenadhayalan et al. | 711/112 |
| 2004/0054866 A1 * | 3/2004 | Blumenau et al. | 711/202 |
| 2005/0018527 A1 * | 1/2005 | Gorobets | 365/232 |
| 2005/0027754 A1 * | 2/2005 | Gajjar et al. | 707/200 |
| 2005/0091455 A1 * | 4/2005 | Kano et al. | 711/114 |
| 2005/0174825 A1 * | 8/2005 | Ware et al. | 365/52 |
| 2008/0256148 A1 * | 10/2008 | Kitamura et al. | 707/205 |
| 2008/0270608 A1 * | 10/2008 | Matsunami et al. | 709/225 |
| 2009/0016212 A1 * | 1/2009 | Cashman et al. | 370/222 |
| 2009/0210639 A1 * | 8/2009 | Mimatsu | 711/156 |

* cited by examiner

METHOD AND SYSTEM FOR DYNAMIC EXPANSION AND CONTRACTION OF NODES IN A STORAGE AREA NETWORK

CROSS-REFERENCE TO RELATED APPLICATIONS

This application claims priority to U.S. Provisional Application No. 60/422,109, filed Oct. 28, 2002 and titled "Apparatus and Method for Enhancing Storage Processing in a Network-Based Storage Virtualization System", which is incorporated herein by reference. This application also relates to the subject matter disclosed in the co-pending U.S. application Ser. No. 10/695,887, by Richard Meyer, et al., titled "Method and System for Dynamic Expansion and Contraction of Nodes in a Storage Area Network", co-pending U.S. application Ser. No. 10/695,889, by Gautam Ghose, et al., titled "Failure Analysis Method and System for Storage Area Networks", co-pending U.S. application Ser. No. 10/695,888, by Tuan Nguyen, et al., titled "Method and System for Managing Time-Out Events in a Storage Area Network", co-pending U.S. application Ser. No. 10/696,434, by Rush Manbert, et al., titled "Method and System for Strategy Driven Provisioning of Storage in a Storage Area Network", filed concurrently herewith.

BACKGROUND OF THE INVENTION

Storage area networks, also known as SANs, facilitate sharing of storage devices with one or more different host server computer systems and applications. Fibre channel switches (FCSs) can connect host servers with storage devices creating a high speed switching fabric. Requests to access data pass over this switching fabric and onto the correct storage devices through logic built into the FCS devices. Host servers connected to the switching fabric can quickly and efficiently share blocks of data stored on the various storage devices connected to the switching fabric.

Storage devices can share their storage resources over the switching fabric using several different techniques. For example, storage resources can be shared using storage controllers that perform storage virtualization. This technique can make one or more physical storage devices, such as disks, which comprise a number of logical units (sometimes referred to as "physical LUNs") appear as a single virtual logical unit or multiple virtual logical units, also known as VLUNs. By hiding the details of the numerous physical storage devices, a storage virtualization system having one or more such controllers advantageously simplifies storage management between a host and the storage devices. In particular, the technique enables centralized management and maintenance of the storage devices without involvement from the host server.

In many instances it is advantageous to place the storage virtualization controller(s) in the middle of the fabric, with the host servers and controllers arranged at the outer edges of the fabric. Such an arrangement is generally referred to as a symmetric, in-band, or in-the-data-path configuration. As storage area networks grow additional ports on the storage area controller and switching fabric are needed to connect additional hosts and storage devices into the network. More ports on the storage controller are also required to handle increasing per-port performance requirements. For example, current SANs provide 6,000 ports with a 3:1 fan in/out ratio measure of performance. Assuming the same 3:1 performance, increasing the SAN size by ten-fold to 60,000 ports would require the storage controller device in the SAN to provide over 20,000 ports in the chassis. Even if per-port performance could be increased to a 6:1 fan in/out ratio, the storage controller device would still be required to provide over 10,000 ports.

Indeed, increasing the size of the storage controller to hold thousands of ports also has drawbacks. Growing customers may not want the added expense of purchasing storage controllers with empty slots to accommodate projected growth and expansion. By the time the company requires the additional ports, advances in technology and manufacturing may render the technology required for the added slots functionally or economically obsolete. Adding ports to a large but older storage controller chassis may be more expensive than buying newer, denser and more reliable storage controller technology. Further, once the larger storage controller is filled then customers must once again face the dilemma of purchasing yet another storage controller chassis and ports. These large storage controllers are not only expensive but cumbersome to manufacture and install.

Even if it were feasible, larger storage controllers are more vulnerable to hardware or software failures. In a SAN, a single hardware or software failure that renders a physical device inoperable will impact the SAN performance. The significance of the failure may depend on the role of the physical device. For example, in the traditional replication of a storage controller instance failure of an original storage controller may lead to a performance degradation of as much as 50%; in most cases, this is an unacceptable impact on the SAN.

Current technique for adding another conventional storage controller may satisfy the increased demand for ports but at the expense of significantly increasing the complexity of managing the SAN. Each additional storage controller chassis and set of ports defines a separate island within the overall storage network. These islands have a separate storage pools and therefore cannot share the storage as readily as storage located on a single SAN.

Performance in the SAN would also most likely suffer when required port ratios in the storage controller described previously are exceeded. Typically performance degradation would create port congestion, over-subscription of resources and reduced input-output performance. The ability to address the increased port demand in the SAN is currently limited by the number of slots and line cards in a given storage controller chassis. Unfortunately, adding additional line cards and ports is not a simple task using conventional storage controller solutions as demonstrated above.

For these and other reasons, it is therefore desirable to improve the scalability, configurability and sizing of storage controllers as used in rapidly growing SANs.

BRIEF DESCRIPTION OF THE DRAWINGS

The features of the present invention and the manner of attaining them, and the invention itself, will be best understood by reference to the following detailed description of implementations of the invention, taken in conjunction with the accompanying drawings, wherein.

SUMMARY OF THE INVENTION

In one implementation, the present invention provides a method for adding a storage controller node in a storage area network. Adding the storage controller includes receiving a storage controller node to add to a logical storage controller in the storage area network having a logical nodename and a sequence of logical ports, adopting the logical nodename from the logical storage controller in place of the predetermined nodename associated with the storage controller and renumbering a set of ports associated with the storage controller to extend the sequence of logical ports associated with the logical storage controller.

In another implementation, the present invention provides a method of removing a storage controller node in a storage area network. Removing a storage controller includes removing a storage controller node from a logical storage controller in the storage area network having a logical nodename and a sequence of logical ports, deleting the set of ports associated with the removed storage controller from the sequence of logical ports associated with the logical storage controller and renumbering the sequence of logical ports to accommodate the deleted set of ports.

DETAILED DESCRIPTION

Aspects of the present invention provide a dynamic method and system for expanding and contracting nodes in a storage area networks. Managing nodes in accordance with the present invention is advantageous for at least one or more of the following reasons described herein. A single storage pool can be managed with multiple storage controllers configured and managed in accordance with the present invention as a single logical storage controller. Ports can be added without increasing the number of storage islands being managed as ports are added in contiguous sequence with preexisting ports in the logical storage controller. Multiple new storage controllers entered into a logical storage controller contribute additional ports to the SAN while appearing as a single and larger storage controller.

Implementations of the present invention facilitate combining multiple storage controllers into a single larger logical storage controller. It can also be used to combine existing and older storage controllers with newer storage controllers. The logical storage controller construct implemented in accordance with the present invention accommodates different storage controllers through a universal application programming interface (API). This API is used to exchange database information between the various controllers pertinent to operation of the overall logical storage controller. The API even makes it possible for storage controllers using different databases to share important SAN configuration information and coexist. This API interface also enables customers to upgrade from an older model storage controller to a newer storage controller without having to remove the existing older storage controller model on the SAN.

Further, another advantage of the present invention provides an increased reliability characteristic given hardware or software failures. In a logical storage controller containing n physical storage controllers the impact of failure from a storage controller can be reduced to approximately 1/n. The larger logical storage controllers have significant improved performance and reliability due to the increased redundancies in ports and communication paths not previously available using conventional solutions.

Management of remote SAN is also simplified by implementations of the present invention. A remote SAN and storage controller can be incorporated into the logical storage controller of the present invention and managed as a single SAN rather than a local SAN and a remote SAN as traditionally found with other solutions. Also, the storage pool on both the local and remote SAN can be combined into a single shared image or island of storage rather than several.

Figure 1:
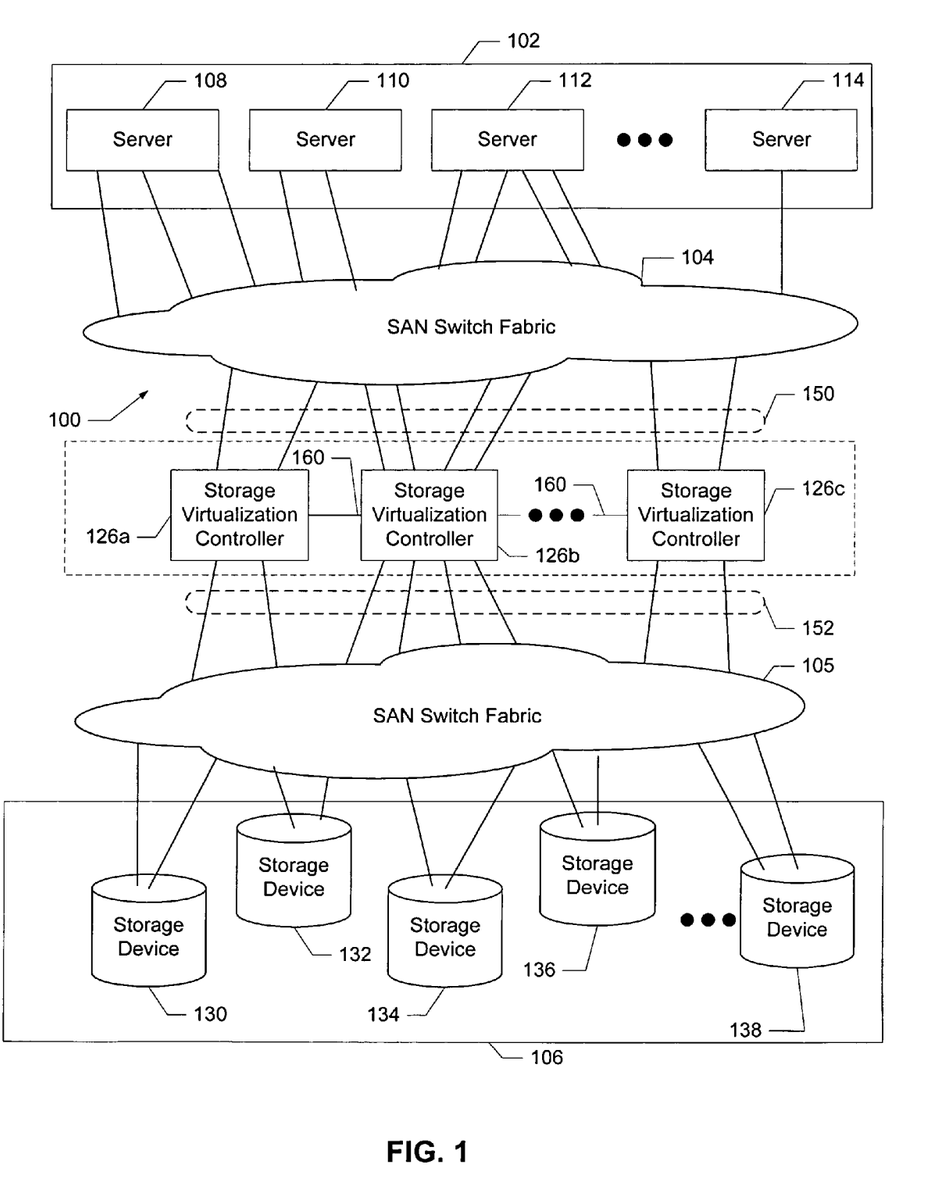
FIG. 1 is an exemplary system block diagram of the logical relationship between host servers, storage devices, and a storage area network (SAN) implemented using a switching fabric along with an implementation of the present invention.

Referring to the exemplary configuration in FIG. 1, a storage area network (SAN) 100 may include one or more SAN switch fabrics, such as fabrics 104,105. Fabric 104 is connected to hosts 102, while fabric 105 is connected to storage devices 106. At least one storage virtualization controller 126 is inserted in the midst of SAN 100, and connected to both fabrics 104,105 to form a symmetric, in-band storage virtualization configuration. In an in-band configuration, communications between server devices 102 and storage devices 106 pass through controller 126 for performing data transfer in accordance with the present invention. In accordance with implementations of the present invention, these one or more storage virtualization controllers 126 or storage controllers 126 appear as a single logical storage controller during operation.

Host servers 102 are generally communicatively coupled (through fabric 104) via links 150 to individual upstream processing elements (UPE) of storage controller 126. In an alternate configuration, one or more host servers may be directly coupled to storage controller 126, instead of through fabric 104. Storage controller 126 includes at least one UPE for each server 102 (such as host servers 108,110,112,114) connected to storage controller 126. As will be discussed subsequently in greater detail, storage controller 126 appears as a virtual logical unit (VLUN) to each host server.

Storage devices 106 are communicatively coupled (through fabric 105) via links 152 to individual downstream processing elements (DPEs) of storage controller 126. In an alternate configuration, one or more storage devices may be directly coupled to storage controller 126, instead of through fabric 105. Storage controller 126 includes at least one DPE for each storage device 106 (such as storage devices 130,132, 134,136,138) connected to the controller 126. Storage controller 126 appears as an initiator to each storage device 106. Multiple storage controllers 126 may be interconnected by external communications link 160. Within each storage controller 126, is node expansion and node contraction routines for adding and deleting storage controllers with supporting hardware and software needed to implement the present invention. As described later herein, the components used for expanding or contracting the nodes in a logical storage controller facilitate scalability of ports in the storage area network in an efficient cost-effective manner without significant increased management overhead requirements.

Figure 2:
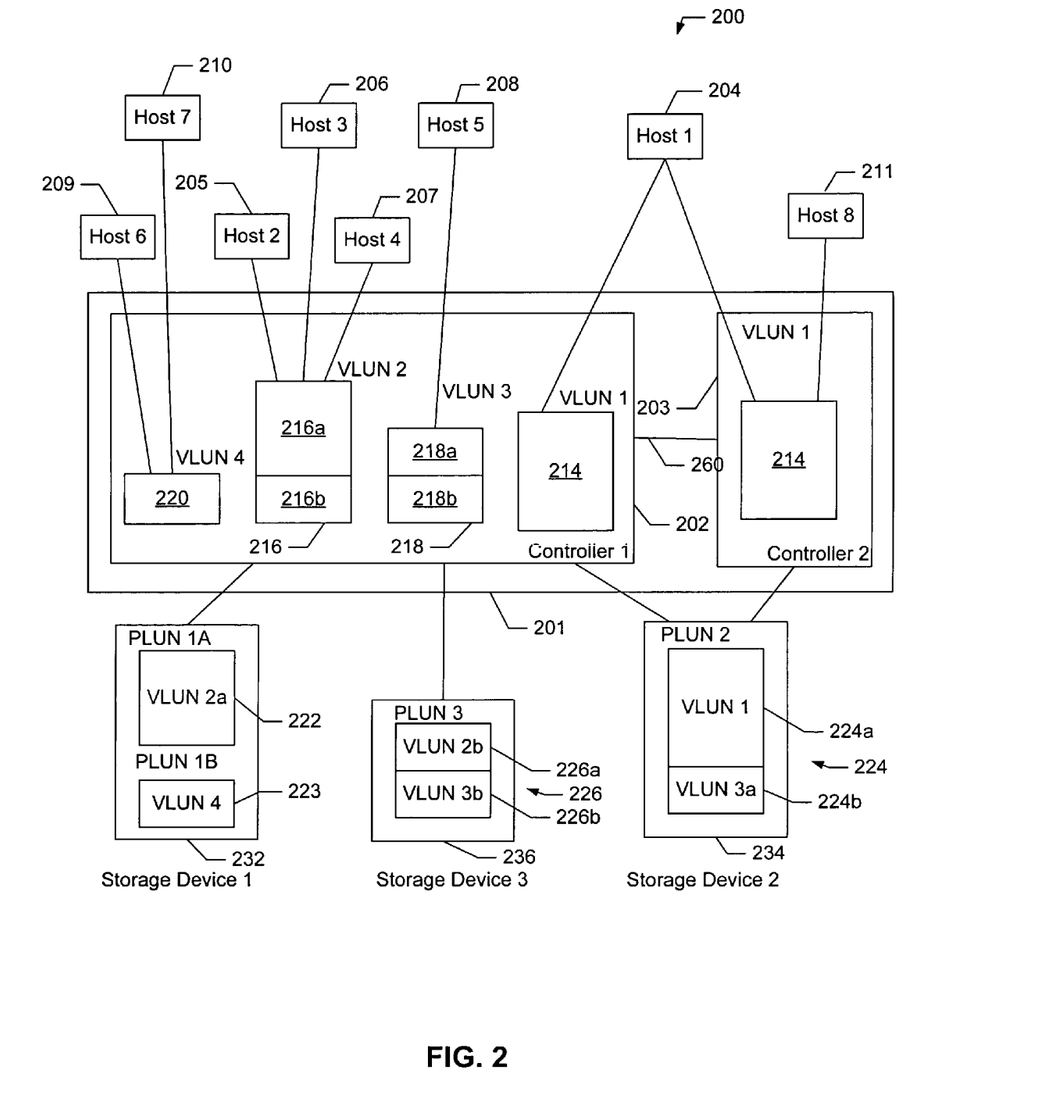
FIG. 2 is an exemplary system block diagram illustrative of the relationship provided by a storage virtualization controller between virtual logical units and logical units on physical storage devices, in accordance with an implementation of the present invention.

Considering now the virtualization of storage provided by an implementation of the present invention, and with reference to the exemplary SAN 200 of FIG. 2, a storage virtualization system includes an exemplary storage virtualization controller arrangement 201. Storage controller arrangement 201 includes, for illustrative purposes, two storage virtualization controllers 202,203 interconnected via external communication link 260. Storage controller1 202 has been configured to provide four virtual logical units 214,216,218,220 associated with hosts 204-210, while controller2 203 has been configured to provide one virtual logical unit 214 associated with hosts 204,211. In the general case, a virtual logical unit (VLUN) includes N "slices" of data from M physical storage devices, where a data "slice" is a range of data blocks. In operation, a host requests to read or write a block of data from or to a VLUN. Through controllers 202 of this exemplary configuration, host1 204 is associated with VLUN1 214; host2 205, host3 206, and host4 207 are associated with VLUN2 216; host5 208 is associated with VLUN3 218, host6 209 and host7 210 are associated with VLUN4 220. Through controller2 203, host1 204 and host8 211 are also associated with VLUN1 214. It can be seen that host1 204 can access VLUN1 214 through two separate paths, one through controller1 202 and one path through controller2 203.

A host 204-211 accesses it's associated VLUN by sending commands to the controller arrangement 201 to read and write virtual data blocks in the VLUN. Controller arrangement 201 maps the virtual data blocks to physical data blocks on individual ones of the storage devices 232,234,236, according to a preconfigured mapping arrangement. Controller arrangement 201 then communicates the commands and transfers the data blocks to and from the appropriate ones of the storage devices 232,234,236. Each storage device 232, 234,236 can include one or more physical LUNs; for example, storage device 1 232 has two physical LUNs, LUN 1A 222 and LUN 1B 223.

To illustrate further the mapping of virtual data blocks to physical data blocks, all the virtual data blocks of VLUN1 214 are mapped to a portion 224a of the physical data blocks LUN2 224 of storage device 234. Since VLUN2 216 requires more physical data blocks than any individual storage device 232,234,236 has available, one portion 216a of VLUN2 216 is mapped to the physical data blocks of LUN1A 222 of storage device 232, and the remaining portion 216b of VLUN2 216 is mapped to a portion 226a of the physical data blocks of LUN3 226 of storage device 236. One portion 218a of VLUN3 218 is mapped to a portion 224b of LUN2 224 of storage device 234, and the other portion 218b of VLUN3 218 is mapped to a portion 226b of LUN3 226 of storage device 236. It can be seen with regard to VLUN3 that such a mapping arrangement allows data block fragments of various storage devices to be grouped together into a VLUN, thus advantageously maximizing utilization of the physical data blocks of the storage devices. All the data blocks of VLUN4 220 are mapped to LUN1B 223 of storage device 232.

While the above-described exemplary mapping illustrates the concatenation of data block segments on multiple storage devices into a single VLUN, it should be noted that other mapping schemes, including but not limited to striping and replication, can also be utilized by the controller arrangement 201 to form a VLUN. Additionally, the storage devices 232, 234,236 may be heterogeneous; that is, they may be from different manufacturers or of different models, and may have different storage sizes, capabilities, architectures, and the like. Similarly, the hosts 204-210 may also be heterogeneous; they may be from different manufacturers or of different models, and may have different processors, operating systems, networking software, applications software, capabilities, architectures, and the like.

It can be seen from the above-described exemplary mapping arrangement that different VLUNs may contend for access to the same storage device. For example, VLUN2 216 and VLUN4 220 may contend for access to storage device 1 232; VLUN1 214 and VLUN3 218 may contend for access to storage device 2 234; and VLUN2 216 and VLUN3 218 may contend for access to storage device 3 236. The storage virtualization controller arrangement 201 according to an implementation of the present invention performs the mappings and resolves access contention, while allowing data transfers between the host and the storage device to occur at wire-speed.

Before considering the various elements of the storage virtualization system in detail, it is useful to discuss, with reference to FIGS. 1 and 2, the format and protocol of the storage requests that are sent over SAN 200 from a host to a storage device through the controller arrangement 201. Many storage devices frequently utilize the Small Computer System Interface (SCSI) protocol to read and write the bytes, blocks, frames, and other organizational data structures used for storing and retrieving information. Hosts access a VLUN using these storage devices via some implementation of SCSI commands; for example, layer 4 of Fibre Channel protocol. However, it should be noted that the present invention is not limited to storage devices or network commands that use SCSI protocol.

Storage requests may include command frames, data frames, and status frames. The controller arrangement 201 processes command frames only from hosts, although it may send command frames to storage devices as part of processing the command from the host. A storage device generally does not send command frames to the controller arrangement 201, but instead sends data and status frames. A data frame can come from either host (in case of a write operation) or the storage device (in case of a read operation).

In many cases one or more command frames is followed by a large number of data frames. Command frames for read and write operations include an identifier that indicates the VLUN that data will be read from or written to. A command frame containing a request, for example, to read or write a 50 kB block of data from or to a particular VLUN may then be followed by 25 continuously-received data frames each containing 2 kB of the data. Since data frames start coming into the controller 203 only after the controller has processed the command frame and sent a go-ahead indicator to the host or storage device that is the originator of the data frames, there is no danger of data loss or exponential delay growth if the processing of a command frame is not done at wire-speed; the host or the storage device will not send more frames until the go-ahead is received. However, data frames flow into the controller 203 continuously once the controller gives the go-ahead. If a data frame is not processed completely before the next one comes in, the queuing delays will grow continuously, consuming buffers and other resources. In the worst case, the system could run out of resources if heavy traffic persists for some time.

Figure 3A:
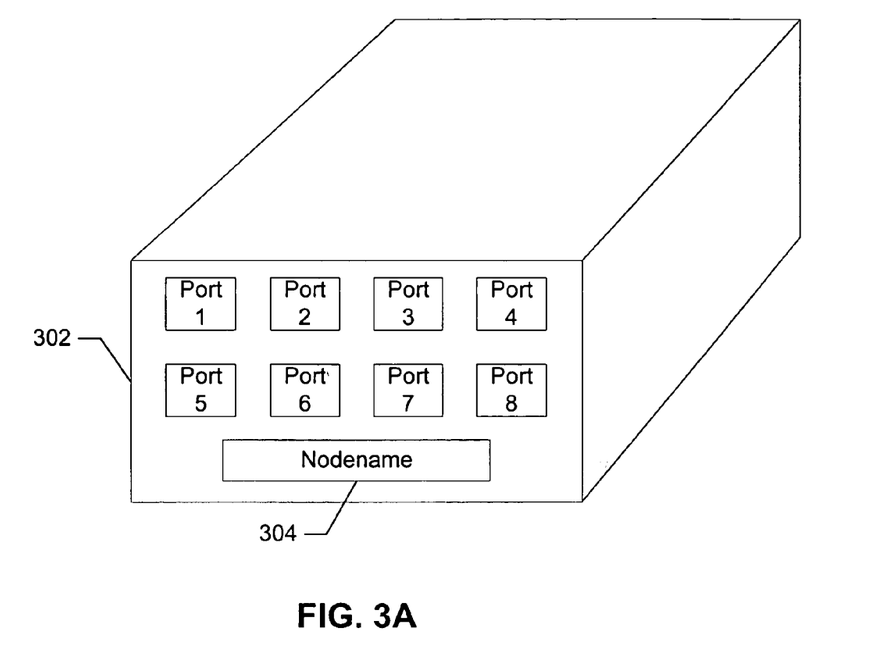
FIG. 3A provides a schematic block diagram illustrating a portion of the physical connections on a storage controller.

FIG. 3A provides a schematic block diagram illustrating a portion of the physical connections on a storage controller. In this example illustration, storage controller 302 includes 8 ports as indicated and is identified with a predetermined nodename determined during manufacturing. This predetermined nodename is also referred to as a world wide nodename (node WWN) and is designed to be distinguishable on a network according to the manufacture and the production sequence of the storage controller by the manufacture. Given these designations, a port on each storage controller brand new out of the box is uniquely identified as a combination of the port and predetermined nodename associated with the storage controller.

Figure 3B:
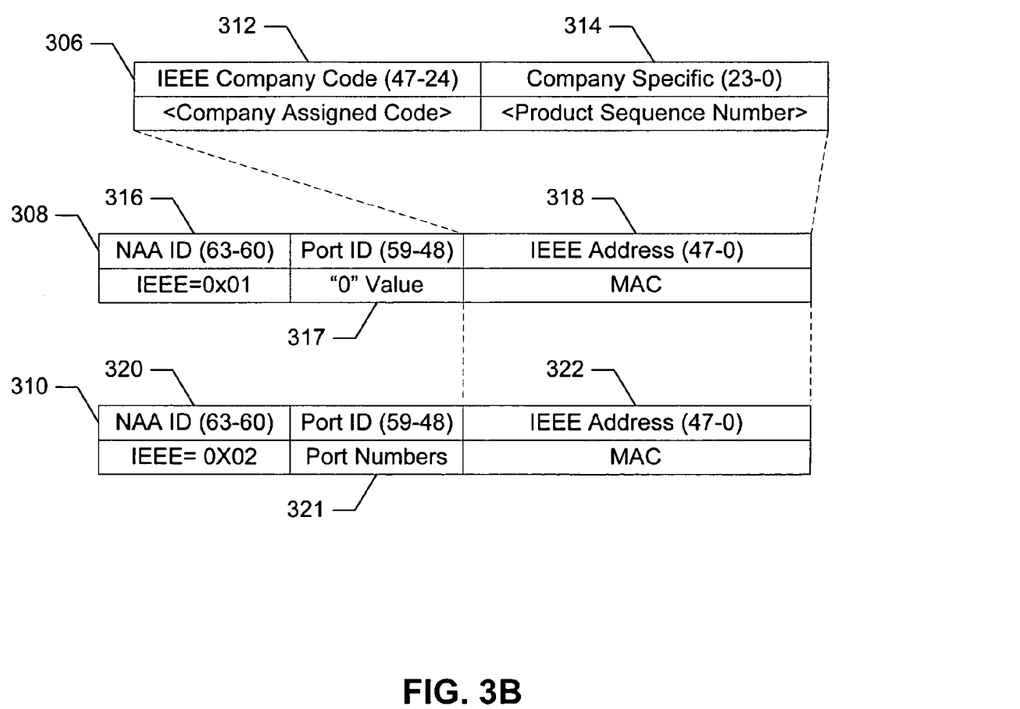
FIG. 3B illustrates one scheme used for addressing a storage controller having a nodename and several port names

FIG. 3B illustrates one scheme used for addressing a storage controller having a nodename and several port names. In FIG. 3B, the nodename is derived from a media access control address (MAC) 306 defined using 48 bits number 0-47. Company specific 314 in bits 0-23 define a vendor specified identifier created when the company manufacturers each particular product. IEEE Company Code in bits 24-47 contains an identifier assigned to each company producing or manufacturing the product. MAC 306 can also be used in association with an Ethernet port in addition to using it to construct a nodename or WWN. As will be described later herein, implementations of the present invention may alter both the predetermined IEEE Company Code 312 as well as the predetermined Company Specific code 314 (together making up the "nodename") so as to change the definition of the values described previously.

Depending on the values contained within, a 64-bit string can describe a nodename 308 or a portname 310. In the first instance, a nodename 308 is indicated by a "0x01" value in bits 60-63 of field Network Address Authority (NAA) 316 ID and a "0" value in bits 48-59 of Port ID 317. Along with IEEE Address 318 or MAC as described above, nodename 308 identifies a WWN for the storage controller. Alternatively, portname 310 is indicated by a "0x02" value in bits 60-63 of field NAA 320 and a port number in bits 48-59 of Port ID 321 identifying the particular port. The port number in bits 48-59 corresponds to the port being identified on the node. IEEE Address 322 in bits 0-47 once again includes a MAC address to identify the storage controller.

Figure 4:
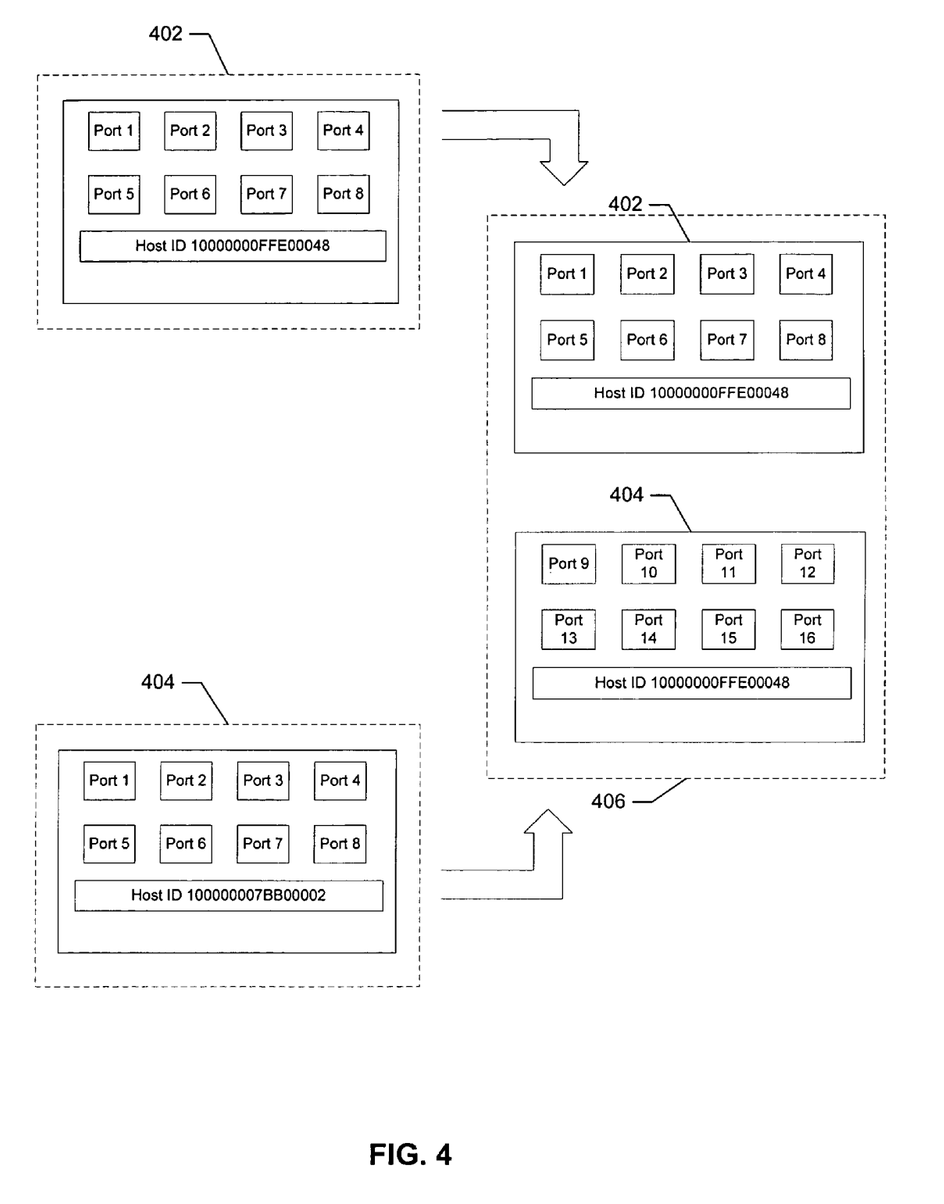
FIG. 4 is a block diagram and overview of combining two storage controllers into one logical storage controller in accordance with implementations of the present invention.

Referring to FIG. 4 is a block diagram and overview of combining two storage controllers into one logical storage controller in accordance with implementations of the present invention. In this example, a first storage controller 402 has 8 ports identified as port 1 through port 8 and a predetermined node name of "10000000FFE00048" assigned to the storage controller during manufacture. Similarly, a second storage controller 404 also has 8 ports ranging from port 1 to port 8 but instead has a predetermined nodename of "100000007BB00002", also assigned during manufacture.

In accordance with the present invention, first storage controller 402 is entered into a logical storage controller arrangement 406. Subsequently, storage controller 404 is added to the arrangement to be used in conjunction with first storage controller 402. In this particular implementation, a logical nodename of "10000000FFE00048" is derived from the predetermined nodename assigned to first storage controller 402 as this storage controller was also the first storage controller added to logical storage controller arrangement 406. As illustrated, second storage controller 304 adopts the logical nodename of "10000000FFE00048" assigned to the logical storage controller arrangement 406 and renumbers the ports in contiguous sequence extending the logical ports of logical storage controller 406 from 8 to a total of 16.

Figure 5:
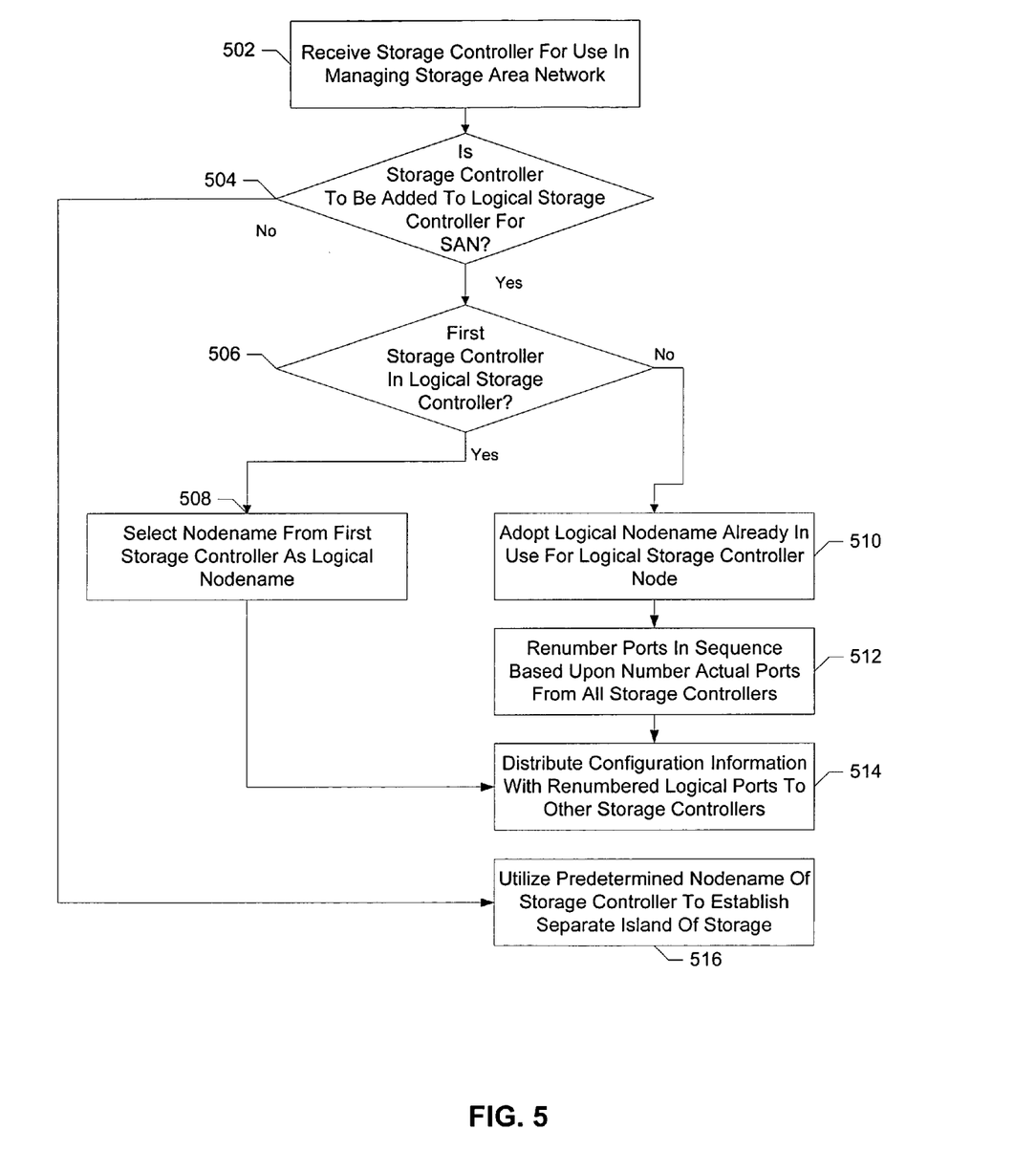
FIG. 5 is a flowchart diagramming of the operations used to add a storage controller node in a storage area network in accordance with one implementation of the present invention.

FIG. 5 is a flowchart diagramming of the operations used to add a storage controller node in a storage area network in accordance with one implementation of the present invention. Initially, a storage controller is received for use in assisting in the managing of the storage area network and expanding the number of available ports (502). The storage controller received has a predetermined nodename and set of ports defined during manufacture.

The administrator or other party configuring the system determines if the storage controller is to be added to a logical storage controller for the SAN or work as a separate storage controller (504). Like conventional systems, implementations of the present invention provide the option of adding the storage controller without further modification using the predetermined nodename of the storage controller and set of ports to establish a separate island of storage (516).

Alternatively, a determination is made if the storage controller is the first storage controller in the logical storage controller (506). In one implementation, the first storage controller added to the logical storage controller arrangement contributes a nodename for use as the logical nodename of the logical storage controller. The logical nodename is a unique world wide node name (WWN).

When at least one storage controller is associated with the logical storage controller arrangement (506), the storage controller adopts the logical nodename from the logical storage controller in place of the predetermined nodename for the storage controller determined during manufacture (510). In addition, implementations of the present invention renumber the set of ports associated with the storage controller to extend the sequence of logical ports associated with the logical storage controller (512). For example, in one configuration the sequence of logical ports is a contiguous numeric sequence of ports generated as sets of ports from each storage controller as they are added to the logical storage controller.

Implementations of the present invention also designate a role for each storage controller in the logical storage controller including: a primary storage controller, a secondary storage controller and a alternate storage controller. The primary storage controller is generally responsible for a variety of roles involved with updating data across the storage controllers in the logical storage controller. In the event the primary storage controller experiences a failure, the secondary storage controller performs tasks assigned to the primary storage controller; alternate storage controllers can also be nominated to step up to a secondary storage controller role as deemed necessary. Once the storage controller is modified, the present invention then generates configuration information reflecting the addition of the storage controller to the logical storage controller and the set of ports added to the corresponding sequence of logical ports.

Implementations of the present invention then distributes configuration information containing the above changes to one or more storage controllers associated with the logical storage controller (514). In one implementation, the configuration information is stored in a database along with other types of metadata useful in operating the logical storage controller of the present invention. For example, the metadata describing the geometry of one or more volumes of data managed by the logical storage controller may include number of physical devices, physical device identifiers, ranges of blocks on the physical devices and total number of blocks. To maintain compatibility, an application programming interface (API) of the present invention passes this metadata and configuration information to one or more databases associated with the respective storage controllers. The API of the present invention communicates with many different types of databases and thereby facilitates combining many different types of storage controllers. Older storage controllers communicate with newer storage controllers and different model storage controllers over an external communication link using this API of the present invention to pass this information.

Aspects of the present invention can also be used to reduce the size of nodes in a logical storage controller. Removing a storage controller node from a logical storage controller in the storage area network affects the number of ports and the sequence of ports. The set of ports associated with the removed storage controller are deleted from the sequence of logical ports associated with the logical storage controller and renumbered to reverse out the operations performed when they were added. The storage controller removed from the logical storage controller cannot be used in another SAN unless it is also properly reprogrammed with a different node-name and set of ports.

Other storage controllers must also be notified of the changes when the storage controller is removed. Accordingly, implementations of the present invention generates configuration information except this time reflecting the deleted storage controller removed from the logical storage controller and the set of ports removed from the corresponding sequence of logical ports. This configuration information and metadata is also once again distributed to one or more storage controllers still associated with the logical storage controller.

Figure 6:
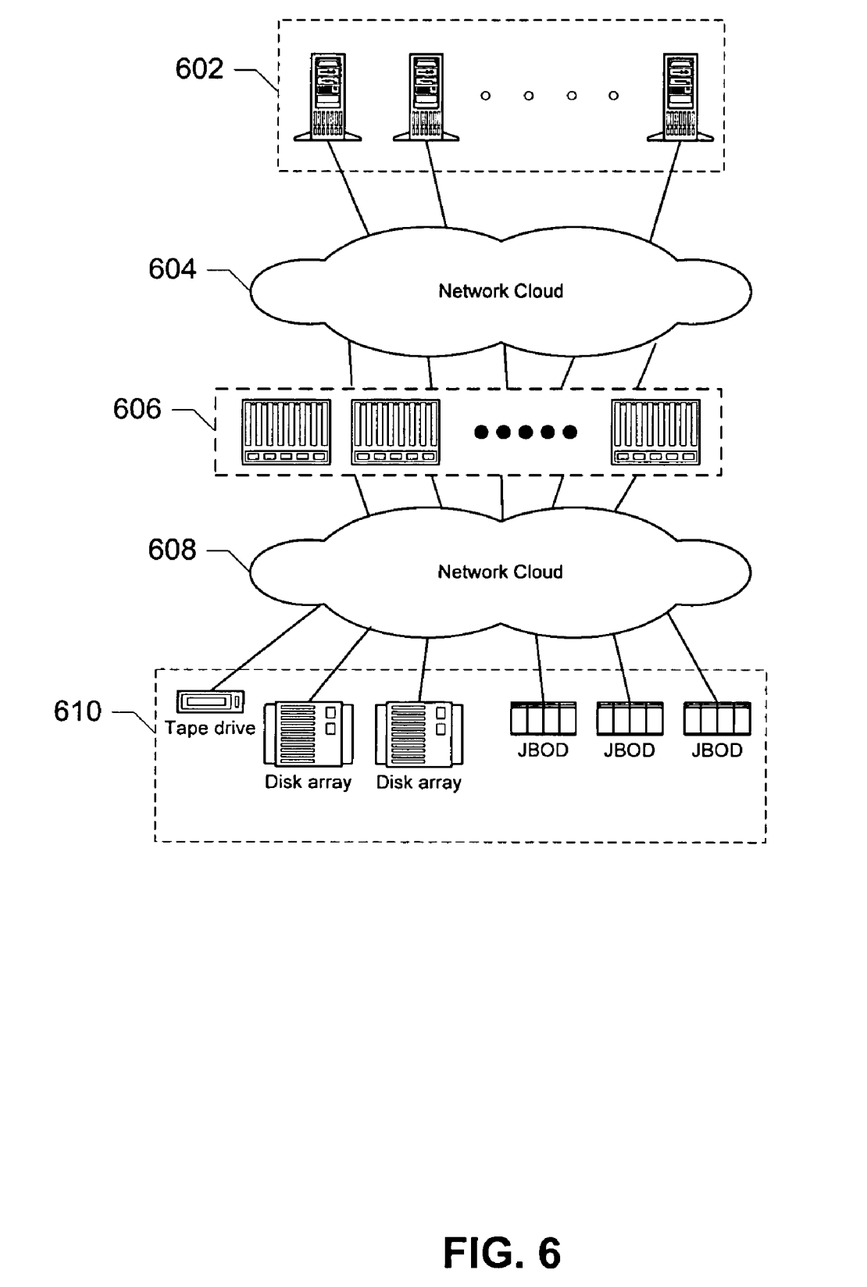
FIG. 6 is a block diagram illustrating a SAN using a logical storage controller in accordance with one implementation of the present invention.

FIG. 6 is a block diagram illustrating a SAN using a logical storage controller in accordance with one implementation of the present invention. As illustrated, a SAN includes hosts 602, a switching fabric 604, a logical storage controller 606 configured in accordance with the present invention, a switching fabric 608 and a storage servers 610. In operation, hosts 602 appear to be accessing a single storage controller namely logical storage controller 606 and therefore have shared access to a single pool of storage servers 610 rather then multiple islands of storage as provided in conventional solutions.

Further, logical storage controller 606 is more reliable as each storage controller within the logical storage controller operates as a backup when ports or whole storage controllers fail. Failed ports or storage controller details are passed between the storage controllers in logical storage controller 606 to create alternate paths between hosts 602 and storage servers 610 thus keeping the SAN operable. If properly configured, a large number of storage controllers n in logical storage controller 606 limits the impact of a fault or failure of hardware or software to 1/n rather than a higher impact suffered in conventional systems.

Figure 7:
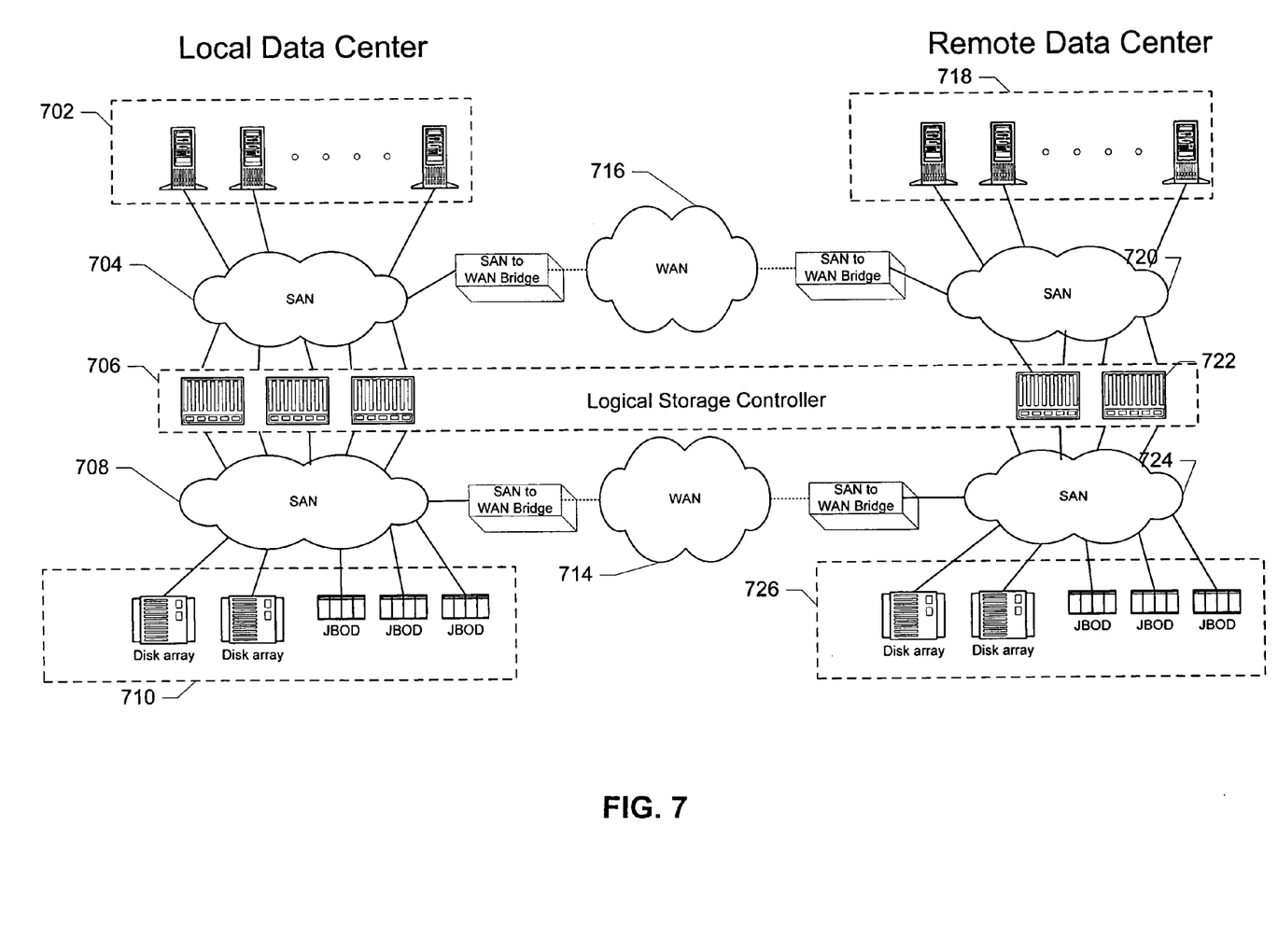
FIG. 7 is a block diagram system configuration of a local and remote data center operatively coupled together using a logical storage controller designed in accordance with one implementation of the present invention.

Referring to FIG. 7 is a block diagram system configuration of a local and remote data center operatively coupled together using a logical storage controller designed in accordance with one implementation of the present invention. Local data center includes hosts 702, a switching fabric 704, a logical storage controller 706 portion designed in accordance with the present invention, a fabric 708 and storage servers 710. Similarly, remote data center includes hosts 718, a switching fabric 720, a logical storage controller 722 portion designed in accordance with the present invention, a fabric 724 and storage servers 726. Wide area network and equipment 716 and wide area network and equipment 714 couple the local data center and remote data center together over a distance. In this example, storage servers 710 and storage servers 726 are physically separate but appear in the same storage pool from both hosts 702 and hosts 718. In large enterprises spanning countries or even continents, this type of arrangement would greatly simplify SAN data storage management as well as improve sharing of underlying data stored in these systems.

Figure 8:
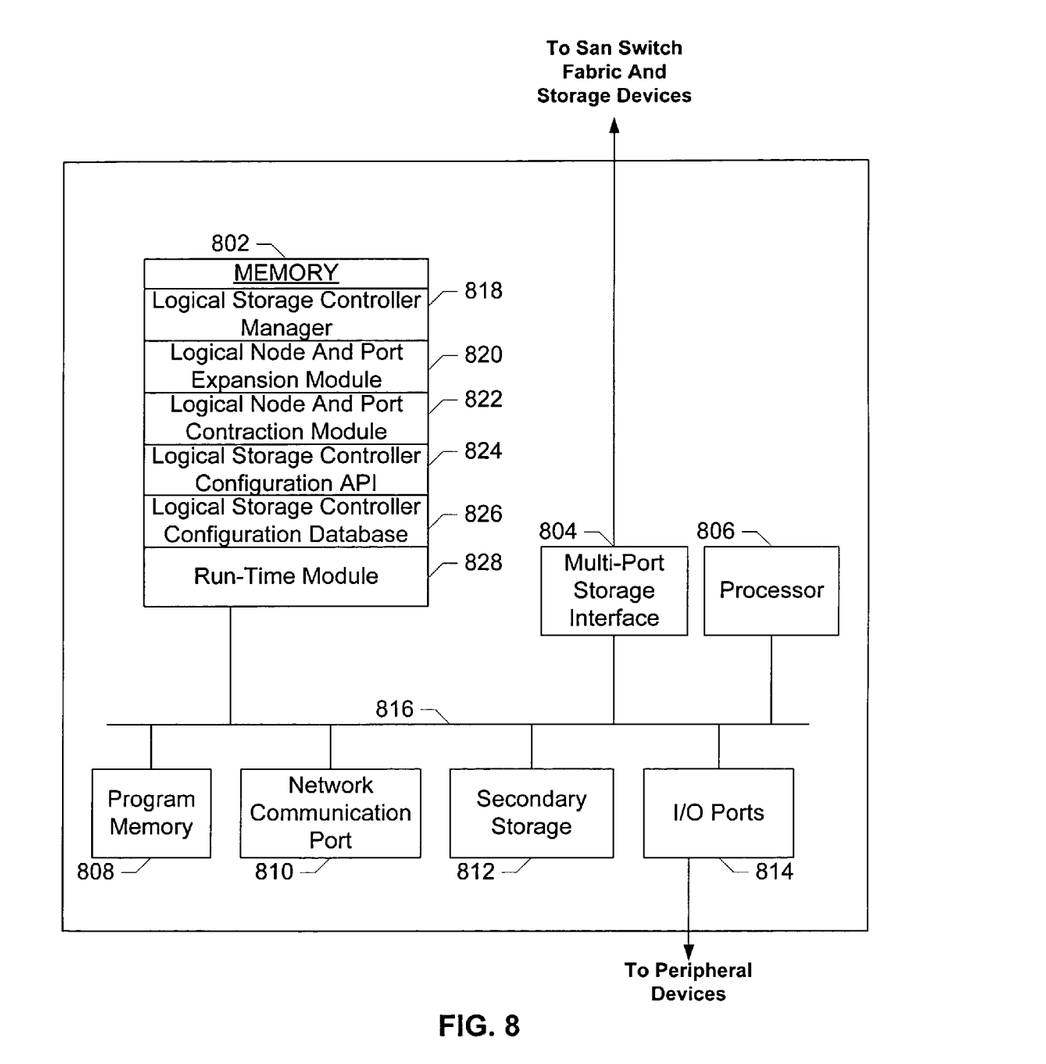
FIG. 8 provides one implementation of the present invention as it would be implemented in a computer device or system.

FIG. 8 provides one implementation of the present invention as it would be implemented in a computer device or system. In this example, system 800 includes a memory 802, typically random access memory (RAM), a multiport storage interface 804, a processor 806, a program memory 808 (for example, a programmable read-only memory (ROM) such as a flash ROM), a network communication port 810 as an alternate communication path, a secondary storage 812, and I/O ports 814 operatively coupled together over interconnect 816. System 800 can be preprogrammed, in ROM, for example using a microcode or it can be programmed (and reprogrammed) by loading a program from another source (for example, from a floppy disk, a CD-ROM, or another computer) and preferably operates using real-time operating system constraints.

Memory 802 includes various components useful in implementing aspects of the present invention. These components include a logical storage controller manager 818, logical node and port expansion module 820, a logical node and port contraction module 822, a logical node configuration API 824 and a logical node configuration database 826 managed using a run-time module 828.

Logical storage controller manager 818 manages the operation of the logical storage controller and communicates information about the status of the logical storage controller to one or more underling storage controllers. Some of these operations may be delegated and distributed to primary, secondary or alternate storage controllers associated with the logical storage controller. Higher level operations handled by logical storage controller manager includes mapping failed ports to functioning ports on other devices as well as redirecting SAN traffic away from failed storage controllers in the logical storage controller.

Logical node and port expansion module 820 performs operations on storage controllers added to the logical storage controller and updates various configuration information, metadata and databases as needed to keep the logical storage controller and system operational. Further, logical node and port contraction module 822 handles the removal of certain storage controllers from the logical storage controller network and the renumbering of ports as needed and previously described.

Logical storage controller configuration API (application programming interface) 824 provides the interface used to communicate between the different storage controllers. This API facilitates communication with a wide variety of databases and thus keeps legacy systems compatible with newer systems as well as with systems manufactured by different third-parties. Logical storage controller configuration database 826 is one example database that holds configuration information, metadata and other information about the current status of the SAN implemented in accordance with a logical storage controller of the present invention. Resources used to run these aforementioned modules are managed efficiently using a run-time module 828 for higher performance and a small memory footprint.

In general, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs (application specific integrated circuits).

While specific implementations have been described herein for purposes of illustration, various modifications may be made without departing from the spirit and scope of the invention. Accordingly, the invention is not limited to the above-described implementations, but instead is defined by the appended claims in light of their full scope of equivalents. From the foregoing it will be appreciated that the storage virtualization controller arrangement, system, and methods provided by the present invention represent a significant advance in the art. Although several specific implementations of the invention have been described and illustrated, the invention is not limited to the specific methods, forms, or arrangements of parts so described and illustrated. For example, the invention is not limited to storage systems that use SCSI storage devices, nor to networks utilizing fibre channel protocol. This description of the invention should be understood to include all novel and non-obvious combinations of elements described herein, and claims may be presented in this or a later application to any novel and non-obvious combination of these elements. The foregoing implementations are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method for adding a storage controller node in a storage area network, comprising:
   receiving a storage controller node to add to a logical storage controller in the storage area network having a logical nodename and a sequence of logical ports;
   adopting the logical nodename from the logical storage controller in place of the predetermined nodename associated with the storage controller; and
   renumbering a set of ports associated with the storage controller to extend the sequence of logical ports associated with the logical storage controller.

2. The method of claim 1 further comprising:
   generating configuration information reflecting the additional storage controller added to the logical storage controller and the set of ports added to the corresponding sequence of logical ports; and
   distributing the configuration information to one or more storage controllers associated with the logical storage controller.

3. The method of claim 1 wherein the logical nodename associated with the logical storage controller is derived from a predetermined nodename associated with one storage controller.

4. The method of claim 1 wherein the predetermined nodename from the first storage controller added to the logical storage controller is used for the logical nodename.

5. The method of claim 1 wherein the logical nodename is a unique world wide node name (WWN).

6. The method of claim 1 wherein the sequence of logical ports is a contiguous numeric sequence of ports generated as sets of ports from each storage controller are added to the logical storage controller.

7. The method of claim 1 wherein each storage controller in the logical storage controller communicates with each other over an external communication link.

8. The method of claim 1 wherein each storage controller added to the logical storage controller is designated a role selected from a set of roles including: a primary storage controller, a secondary storage controller and a alternate storage controller.

9. The method of claim 8 wherein the secondary storage controller performs tasks assigned to the primary storage controller when the primary storage controller experiences a failure.

10. The method of claim 2 wherein the configuration information generated includes metadata describing the geometry of one or more volumes of data managed by the logical storage controller.

11. The method of claim 10 wherein the metadata information is selected from a set including: number of physical devices, physical device identifiers, ranges of blocks on the physical devices and total number of blocks.

12. The method of claim 2 wherein distributing the configuration information is performed using an application programming interface compatible with one or more databases.

13. A method of removing a storage controller node in a storage area network, comprising:
   removing a storage controller node from a logical storage controller in the storage area network having a logical nodename and a sequence of logical ports;
   deleting the set of ports associated with the storage controller removed from the sequence of logical ports associated with the logical storage controller; and
   renumbering the sequence of logical ports to accommodate the deleted set of ports.

14. The method of claim 1 further comprising:
   generating configuration information reflecting the deleted storage controller removed from the logical storage controller and the set of ports removed from the corresponding sequence of logical ports; and
   distributing the configuration information to one or more storage controllers associated with the logical storage controller.

15. An apparatus for adding a storage controller node in a storage area network, comprising:
   a processor capable of executing instructions;
   a memory containing instructions when executed on the processor receive a storage controller node to add to a logical storage controller having a logical nodename and a sequence of logical ports in the storage area network, adopt the logical nodename from the logical storage controller in place of the predetermined nodename associated with the storage controller and renumber a set of ports associated with the storage controller to extend the sequence of logical ports associated with the logical storage controller.

16. The apparatus of claim 15 further comprising instructions that generate configuration information reflecting the additional storage controller added to the logical storage controller and the set of ports added to the corresponding sequence of logical ports and distribute the configuration information to one or more storage controllers associated with the logical storage controller.

17. The apparatus of claim 15 wherein the instructions derive the logical nodename associated with the logical storage controller from a predetermined nodename associated with one storage controller.

18. The apparatus of claim 15 wherein the instructions use the predetermined nodename from the first storage controller added to logical storage controller for the logical nodename.

19. The apparatus of claim 15 wherein the logical nodename is a unique world wide node name (WWN).

20. The apparatus of claim 15 wherein the sequence of logical ports is a contiguous numeric sequence of ports generated as sets of ports from each storage controller are added to the logical storage controller.

21. The apparatus of claim 15 wherein instructions in each storage controller in the logical storage controller communicate with each other over an external communication link.

22. The apparatus of claim 15 wherein instructions designate a role to each storage controller added to the logical storage controller selected from a set of roles including: a primary storage controller, a secondary storage controller and a alternate storage controller.

23. The apparatus of claim 22 wherein the secondary storage controller performs tasks assigned to the primary storage controller when the primary storage controller experiences a failure.

24. The apparatus of claim 16 wherein the instructions that generate the configuration information includes metadata describing the geometry of one or more volumes of data managed by the logical storage controller.

25. The apparatus of claim 16 wherein instructions selected the metadata information from a set including: number of physical devices, physical device identifiers, ranges of blocks on the physical devices and total number of blocks.

26. The apparatus of claim 16 wherein instructions perform distribution of the configuration information using an application programming interface compatible with one or more databases.

27. An apparatus for removing a storage controller node in a storage area network, comprising:
a processor capable of executing instructions;
a memory containing instructions when executed on the processor remove a storage controller node from a logical storage controller in the storage area network having a logical nodename and a sequence of logical ports, delete the set of ports associated with the storage controller removed from the sequence of logical ports associated with the logical storage controller and renumber the sequence of logical ports to accommodate the deleted set of ports.

28. The apparatus of claim 27 further comprising instructions that generate configuration information reflecting the deleted storage controller removed from the logical storage controller and the set of ports removed from the corresponding sequence of logical ports and distribute the configuration information to one or more storage controllers associated with the logical storage controller.

* * * * *